April 30, 1940.   J. M. OLDHAM   2,199,007
JOINTED NUT AND METHOD OF MAKING SAME
Filed June 8, 1938
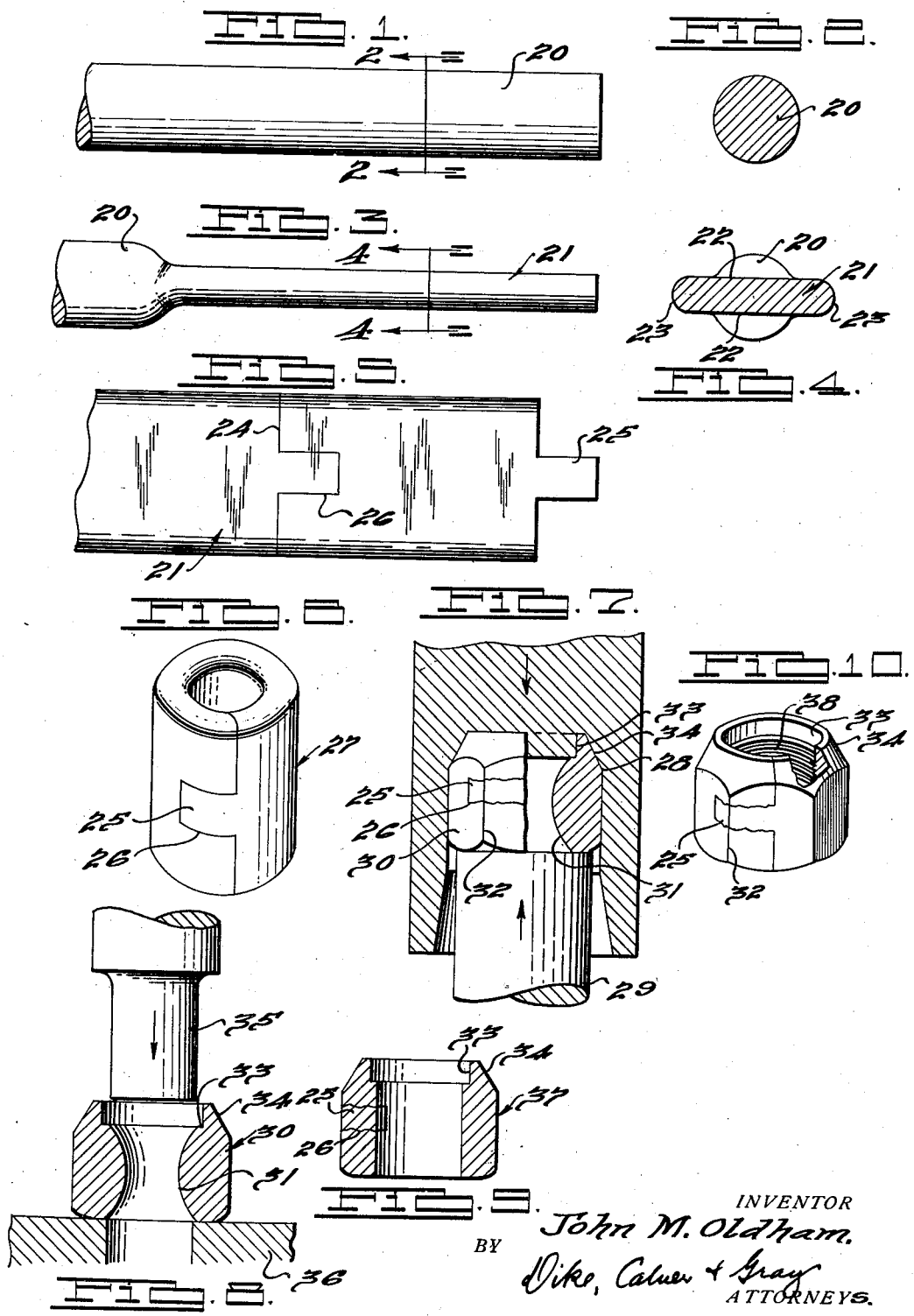
INVENTOR
John M. Oldham.
BY Dike, Calver + Gray
ATTORNEYS.

Patented Apr. 30, 1940

2,199,007

UNITED STATES PATENT OFFICE 2,199,007

JOINTED NUT AND METHOD OF MAKING SAME

John M. Oldham, Pleasant Ridge, Mich., assignor to Leonard A. Young, Detroit, Mich.

Application June 8, 1938, Serial No. 212,532

2 Claims. (Cl. 85—32)

The present invention relates to an improvement in annular objects and particularly to improvements in machine nuts and a method of forming the same. The method herein disclosed is adapted to the formation of annular objects other than machine nuts.

It is a principal object of the present invention to provide an improved annular object such for example as a machine nut which may be formed from a flat blank and which is stronger than similar objects of comparable sizes of conventional construction, and which may be produced by production manufacturing methods at substantial savings in cost over similar objects of conventional construction.

Another object of the present invention is to provide a machine nut in which the threaded section of the outer surfaces of the nut are so formed as to provide different degrees of hardness of the metal at such points whereby increased efficiency is achieved in using such a nut on the threaded shank of a bolt or the like.

Another object of the present invention is to provide a machine nut of improved design and a method of manufacturing the same in which efficient and economical utilization of the metal stock is achieved and whereby at the same time nuts are produced which are substantially uniform in appearance and size.

Another object of the present invention is to provide a jointed machine nut formed from a flat blank in which the joining of the ends of the blank is effected by a positive locking of the parts in the completed nut.

A still further object of the present invention is to provide a machine nut of improved design and an improved method of manufacturing the same which is adapted to provide nuts having external plane surfaces of any desired contour and angular relationship, as well as having any desired type of annular opening, as for example a cylindrical hole, a counterbore, a conical or tapering opening, or the like, without requiring machining operations to form the exterior surfaces or interior construction. The formed interior may be threaded by conventional methods if desired.

Other objects of this invention will appear in the following description and appended claims, reference being had to the accompanying drawing forming a part of this specification wherein like reference characters designate corresponding parts in the several views.

Figs. 1 and 2 are respectively an elevation and a section taken substantially on the line 2—2 of Fig. 1 in the direction of the arrows and showing a metal blank in the form of round wire which may be used to produce a machine nut of the present invention by the method herein set forth.

Figs. 3 and 4 are respectively an elevation and a section taken substantially on the line 4—4 of Fig. 3 in the direction of the arrows and showing a flattened metal blank having rounded edge portions which are formed by exerting pressure on opposed surfaces of the round wire stock shown in Figs. 1 and 2.

Fig. 5 is a fragmentary elevation showing the flattened stock of Figs. 3 and 4 and illustrating the step of cutting the stock to form a blank as a step in the manufacture of a machine nut therefrom.

Fig. 6 is a view in perspective of the cut blank shown in Fig. 5 formed as a cylindrical blank in which the opposed ends of the cut blank are connected, this constituting a succeeding step from that shown in Fig. 5.

Fig. 7 is a fragmentary section illustrating somewhat diagrammatically the step of upsetting or swaging the cylindrical blank of Fig. 6 to the desired exterior size and shape of the finished machine nut.

Fig. 8 is a fragmentary section illustrating somewhat diagrammatically the step of punching the excess metal from the interior portion of the blank nut formed by the upsetting or swaging operation of the preceding step as shown in Fig. 7.

Fig. 9 is a cross section showing the unthreaded nut blank at the completion of the punching operation shown in Fig. 8.

Fig. 10 is a view in perspective with part broken away showing the completed machine nut at the conclusion of the threading operation.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The method of the present invention may be utilized to produce various types of formed metal articles from flat metal stock, such for example as may be formed by exerting pressure on opposed sides of a round wire stock. The method also may be used in forming such articles from flat sheet or rolled strip metal stock.

In the following description and appended claims the improved machine nut of the present invention will be particularly described, as well as the steps of the method for forming the same. It is to be understood, however, that the method is not limited specifically to the formation of a nut of the type herein disclosed.

The improved nut of the present invention is a jointed nut which is formed from a metal strip as distinguished from conventional processes which produce a nut by machine operations from a solid piece of metal stock, usually metal bar stock. For example, in forming a hexagonal nut by conventional methods, hexagonal bar stock is utilized and is processed by screw machine operations which bore and tap the interior to form screw threads and which machine the exterior to the configuration desired and cut the stock to the lengths desired. By such processes, a considerable amount of the metal bar stock is cut away and forms scrap of a relatively small commercial value. The nut of the present invention may be formed from a strip of metal and will reduce by approximately 50% the amount of scrap material produced in comparison to the scrap material produced by conventional machining operations.

A nut which is used in large quantities in the automotive industry is known as a wheel nut and may comprise a hexagonal nut having a tapering end portion adapted to fit in the flange of the wheel and connect the flange of the wheel to the hub carried by the axle. In the following specification such a nut will be described as an illustrative embodiment of the present invention and the method of forming such a nut will be described as illustrating particularly some of the features of the present method. It is to be understood, however, that a nut embodying the improved design of the present invention and the method herein disclosed may also be employed for the formation of any desired type of machine nut construction, such for example as castellated nuts or nuts of any desired geometric form and of various sizes, and the present invention is not to be limited to the formation of wheel nuts herein described.

In carrying out the present invention in a preferred embodiment thereof, a piece of round metal wire stock 20 may be utilized, as shown in Figs. 1 and 2. This stock is then subjected to pressure on opposed sides to form a flattened section 21 having opposed flat surfaces 22 and opposed rounded edge sections 23. This method of forming the metal blank stock is desirable since the rounded edge portions 23 effect a saving of metal over that which would be required if the edges 23 were flat surfaces. The rounded longitudinal edge sections are desirable also in eliminating sharp edges on the portions of the blank and thus facilitating the flow of the metal during the forming operations without the strains therein which occur when using a sharp edged blank.

It is to be understood, however, that any other desired type of metal stock may be used, such for example as a flat sheet stock or metal strips having square or sharp edges, although some of the economies of manufacture and efficiency of operation may be lost by the use of such a blank. In the formation of a wheel nut the metal stock is preferably an unhardened, low carbon steel wire; however, a hardened wire stock may be used by first subjecting the wire to an annealing operation. Other types of nuts may use various types of material and it is to be understood that any desired type of metal may be used either in the form of the round wire or in the form of flat strips.

As an initial step in the formation of a nut from the blank shown in Figs. 3 and 4, the blank is cut as shown in Fig. 5 along the line 24 to provide an extending tongue portion 25 and a recessed groove portion 26. The tongue 25 and the groove 26 are formed on opposed ends of the blank and are so shaped and of such sizes that when the blank is folded as shown in Fig. 6 to provide a cylindrical blank 27, the tongue 25 mates in the groove 26. The cylindrical blank 27 may be formed in a separate operation or may be formed as the flat blanks are cut by using a compound piercing and forming die.

As shown in Fig. 6, the tongue 25 and the recess 26 on the cylindrical blank 27 are of greater widths than the tongue and groove of the completed nut as shown in Fig. 10. This difference in width corresponds proportionally to the difference in the height of the cylindrical blank 27 and the height of the completed nut as shown in Fig. 10. In the particular embodiment here shown the height of the cylindrical blank 27 is approximately 40% greater than the height of the completed nut and the tongue 25 is therefore approximately 40% greater in width when in the form of the cylindrical blank 27 than as shown by the nut illustrated in Fig. 10 at the completion of the operation. During this operation the lengths of the tongue 25 and the groove 26 remain substantially constant as the exterior flow of the metal circumferentially is prevented by the abutting shoulders of the end sections and by the opening in the forming die. As a result of the operation, the mating surfaces of the tongue 25 and the groove 26 are mutually distorted by the flow of the metal substantially as indicated in Figs. 7, 9 and 10. This flow of the metal as shown is irregular and the adjoining surfaces of the tongue 25 and groove 26 are thus definitely locked against disengagement.

After the stock has been formed as the cylindrical blank 27, it is then placed between a forming die 28 and a punch 29 as shown diagrammatically in Fig. 7 and pressures are exerted thereon sufficient to force the metal blank 27 to taken on an exterior contour corresponding to the contour of the interior opening in the forming die 28.

In forming a wheel nut from low carbon wire stock, pressures of the order of approximately 250 tons per square inch are exerted on the cylindrical blank 27 and cause it to take on the configuration of the formed blank 30. Due to the open center of the cylindrical blank 27, the excess metal flows to the interior of the blank as shown at 31, so no damage to the blank or the forming machine will result.

It will be apparent that any desired configuration can be given to the interior of the blank adjacent its ends and to the exterior of the blank during this swaging or upsetting operation. For example, a counter-bore 33 may be provided in the interior during the same operation which forms the exterior contour and the tapered end portion 34. This operation is essentially an upsetting or swaging operation and the exertion of high pressures on the cylindrical metal blank 27 causes the metal of the blank to flow into the form shown in Fig. 7. This operation also produces a coined surface of hardened metal on the exterior surfaces of the blank. This is particularly desirable as it eliminates much damage to the edges of the exterior surface of the nut and provides metal having a hardened, wear resisting surface for contact with wrenches or for use as bearing surfaces. In the particular instance here described, the tapered end section 34 has a direct contact with the metal portion of the wheel and is in effect a bearing surface. This method of forming the tapered surface 34 provides an accurate centering of the wheel on the bearing surface and at the same time provides a hardened wearing surface at the points of contact with the wheel flange. The next step in the formation of the completed nut consists in the removal of the excess stock 31 from the interior of the central opening. This is illustrated somewhat diagrammatically in Fig. 8 wherein the blank 30 is placed between the punch 35 and a shear plate 36. The punch 35 is of the desired shape and size to remove the excess metal 31 by a punching operation and to form the interior opening of the desired size and shape as shown by the blank 37 in Fig. 9. In commercial practice, the punching operation preferably is combined with the upsetting or swaging operation in a combination swaging and punching die.

After the excess metal is removed from the blank 37, the nut is completed by conventional methods to form the threaded interior 38. This provides a completed nut such as shown in Fig. 10. The completed nut as shown in Fig. 10 will be seen to be in the form of a jointed nut having a tongue portion 25 and a groove portion 26 which extend beyond the line 32 defining one edge of a flat face of the nut and which terminate in a face of the nut extending at an angle thereto. The tongue 25 thus extends beyond the edge 32 of the nut blank and is bent to provide a mechanical locking together of the sections of the nut against circumferential separation. The unequal flow of the metal on the adjacent faces of the tongue 25 and the groove 26 provides a mechanical locking of the nut against radial separation of the parts. It is to be understood that the tongue 25 may, if desired, extend over several of the faces of the nut exterior.

It will be apparent that the construction herein disclosed provides an interior threaded portion which is not hardened by the manufacturing operations to the same extent that the outer surface of the nut is hardened. In fact, the metal adjacent the annular opening is not appreciably harder at the conclusion of the process than the metal of the unformed blank. Thus there is no necessity for using agents, such for example as sulphur, in the metal to soften it for the threading operation. This feature is desirable as it provides stock for forming the threads in the softer metal section so that more yield is given to the threads and thus reduces breakage of the threads in the nut or stripping of a male threaded shank connected therewith. At the same time the nut is provided with the hardened metal exterior surface which provides bearing surfaces as well as gripping surfaces of increased hardness and of superior wearing qualities. This is in distinction to conventional processes in which the nut must be hardened after the machining has been completed and all portions of the nut are usually hardened substantially uniformly. By the method of the present invention it is possible to form a generally cylindrical or hexagonal object such for example as a machine nut from flat metal stock with the formation of not to exceed approximately 6% of scrap from the metal blank.

It will be seen, therefore, that the nut of the present invention provides a nut having any desired type of exterior contour without the necessity for machining operations; also that the improved nut of the present invention possesses a difference in hardness of the metal at the interior screw-threaded section and at the exterior points of contact. This feature shows to advantage in comparative tests with nuts of conventional design wherein it has been found that the jointed nut construction in combination with the comparatively softer thread sections gives an increased gripping of the male bolt threads and eliminates stripping of such threads by the same forces which strip the threads in nuts of conventional design and manufactured by conventional methods.

While in the foregoing a particular method has been disclosed for the formation of the improved nut of the present invention, it is to be understood that other methods of forming the nut also are within the scope of the present invention and are intended to be covered within the scope of the appended claims.

I claim:

1. A nut having a body comprising abutting sections provided with a threaded interior and a hardened coined exterior surface, said abutting sections having interfitting male and female members formed therein and extending in opposite directions from one exterior flat coined surface into another angularly disposed flat coined surface, and said male and female members pressed from initially smooth surfaces into opposed irregular top and bottom edges interfitting and interlocked to lock the abutting sections of the body together to provide in effect an integral nut.

2. A wheel nut comprising a jointed interlocked body having abutting sections provided with hardened coined exterior surfaces formed to provide an annular tapered bearing and a plurality of flat faces lying in intersecting planes, said nut having a threaded interior adapted to engage the threaded end of an extended wheel stud, one of said abutting sections having an elongated groove formed therein extending in one direction from one of said flat faces into the next adjacent flat face of the other abutting section, and an elongated tongue extending in the opposite direction from the last named flat face into said first named flat face, said tongue and groove being disposed in interfitting and interlocked relationship and pressed from initially smooth surfaces into irregular opposed edge surfaces in intimate engagement whereby to lock said abutting sections together.

JOHN M. OLDHAM.